United States Patent
Wang et al.

(10) Patent No.: US 9,077,998 B2
(45) Date of Patent: Jul. 7, 2015

(54) PADDING OF SEGMENTS IN CODED SLICE NAL UNITS

(75) Inventors: Ye-Kui Wang, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 418 days.

(21) Appl. No.: 13/548,825

(22) Filed: Jul. 13, 2012

(65) Prior Publication Data

US 2013/0114736 A1     May 9, 2013

Related U.S. Application Data

(60) Provisional application No. 61/557,259, filed on Nov. 8, 2011, provisional application No. 61/555,932, filed on Nov. 4, 2011.

(51) Int. Cl.
| | |
|---|---|
| *H04N 7/12* | (2006.01) |
| *H04N 11/02* | (2006.01) |
| *H04N 11/04* | (2006.01) |
| *H04N 19/436* | (2014.01) |

(Continued)

(52) U.S. Cl.
CPC ........... *H04N 19/436* (2014.11); *H04N 19/176* (2014.11); *H04N 19/70* (2014.11); *H04N 19/174* (2014.11); *H04N 19/17* (2014.11)

(58) Field of Classification Search
CPC ............ H03M 7/40; H04N 7/263; G06T 1/20
USPC ................ 345/552, 501; 375/240.24, 240.01, 375/E7.026, E7.081; 341/58, 67; 382/233, 382/250
See application file for complete search history.

(56) References Cited

U.S. PATENT DOCUMENTS

| | | | |
|---|---|---|---|
| 5,471,248 A * | 11/1995 | Bhargava et al. | ........ 375/240.24 |
| 5,532,744 A | 7/1996 | Akiwumi-Assani et al. | |

(Continued)

FOREIGN PATENT DOCUMENTS

| | | |
|---|---|---|
| EP | 2216994 A2 | 8/2010 |
| WO | WO2009119888 A1 | 10/2009 |

(Continued)

OTHER PUBLICATIONS

Bross et al., "High efficiency video coding (HEVC) text specification draft 7," 9th Meeting: Geneva, CH, Apr. 27-May 7, 2012, JCTVC-I1003_d2, 290 pp.

(Continued)

*Primary Examiner* — Geepy Pe
*Assistant Examiner* — Patricia I Young
(74) *Attorney, Agent, or Firm* — Shumaker & Sieffert, P.A.

(57) ABSTRACT

A video encoder divides a picture into a plurality of picture partitions, such as tiles or wavefront parallel processing (WPP) waves. The picture partitions are associated with non-overlapping subsets of the treeblocks of the picture. The video encoder generates a coded slice network abstraction layer (NAL) unit that includes encoded representations of the treeblocks associated with a slice of the picture. The coded treeblocks are grouped within the coded slice NAL unit into segments associated with different ones of the picture partitions. The video encoder pads one or more of the segments such that each of the segments begins on a byte boundary.

31 Claims, 8 Drawing Sheets

(51) Int. Cl.
*H04N 19/176* (2014.01)
*H04N 19/70* (2014.01)
*H04N 19/174* (2014.01)
*H04N 19/17* (2014.01)

(56) References Cited

U.S. PATENT DOCUMENTS

| | | | |
|---|---|---|---|
| 5,557,332 | A | 9/1996 | Koyanagi et al. |
| 6,919,826 | B1 | 7/2005 | Peacock |
| 7,375,661 | B2 * | 5/2008 | Chiba et al. ................. 341/67 |
| 7,595,743 | B1 | 9/2009 | Winger et al. |
| 7,782,943 | B2 | 8/2010 | Jeon et al. |
| 2007/0177672 | A1 | 8/2007 | Yang |
| 2008/0013620 | A1 | 1/2008 | Hannuksela et al. |
| 2008/0013622 | A1 | 1/2008 | Bao et al. |
| 2008/0253461 | A1 | 10/2008 | Lin et al. |
| 2009/0002379 | A1 | 1/2009 | Baeza et al. |
| 2009/0245349 | A1 | 10/2009 | Zhao et al. |
| 2009/0245661 | A1 * | 10/2009 | Ilbery ........................ 382/233 |
| 2010/0046635 | A1 * | 2/2010 | Pandit et al. ............ 375/240.25 |
| 2010/0098157 | A1 | 4/2010 | Yang |
| 2010/0111183 | A1 | 5/2010 | Jeon et al. |
| 2011/0055661 | A1 | 3/2011 | Grube et al. |
| 2011/0110436 | A1 | 5/2011 | Schierl et al. |
| 2012/0075436 | A1 | 3/2012 | Chen et al. |
| 2012/0082218 | A1 | 4/2012 | Misra et al. |
| 2012/0163452 | A1 | 6/2012 | Horowitz |
| 2012/0166582 | A1 | 6/2012 | Binder |
| 2012/0189049 | A1 | 7/2012 | Coban et al. |
| 2012/0230428 | A1 | 9/2012 | Segall et al. |
| 2013/0114735 | A1 | 5/2013 | Wang |

FOREIGN PATENT DOCUMENTS

| | | |
|---|---|---|
| WO | 2010050157 A1 | 5/2010 |
| WO | WO2011048303 A1 | 4/2011 |

OTHER PUBLICATIONS

Bross et al., "High efficiency video coding (HEVC) text specification draft 8," 10th Meeting: Stockholm, SE, Jul. 11-20, 2012, JCTVC-J1003_d7, 261 pp.

Bross, et al., "WD4: Working Draft 4 of High-Efficiency Video Coding", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL: http://WFTP3.ITU.INT/AV-arch/JCTVC-site/, No. JCTVC- F803, Sep. 8, 2011, XP030009800, 216 pp. [uploaded in three parts].

Bross et al., "High efficiency video coding (HEVC) text specification draft 6," 8th Meeting: San Jose, CA, USA, Feb. 1-10, 2012, JCTVC-H1003, 259 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1003_d2, 214 pp.

Chen, et al.,"AHG 17: Unified NAL unit header design for HEVC and its extensions", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-TSG. 16 ); URL: http://WFTP3.ITU.INT/Av-arch/JCTVC-site/ No. JCTVC-G336, XP030110320, 7 pp.

Clare et al., "Wavefront and Cabac Flush: Different Degrees of Parallelism Without Transcoding," Joint Collaborative Team on Video Coding, JCTVC-F275 PowerPoint, Jul. 14-22, 2011, 12 slides.

Coban et al., "AHG4: Unification of picture partitioning schemes", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://WFTP3.ITU.INT/AV-arch/JCTVC-site/,, No. JCTVC-G315, XP030110299, 11 pp.

Fuldseth et al., "Tiles," Joint Collaborative Team on Video Coding, JCTVC-F335 PowerPoint, Jul. 14-22, 2011, 12 slides.

Horowitz, "JCT-VC BoG report: tiles and wavefront parallel processing", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://WFTP3.ITU.INT/AV-arch/JCTVC-site/, No. JCTVC-G1025, XP030111009, 8 pp.

International Search Report and Written Opinion—PCT/US2012/063027—ISA/EPO—Jan. 30, 2013, 16 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

McCann et al., "HM4: HEVC Test Model 4 Encoder Description", MPEG Meeting; Jul. 18, 2011-Jul. 22, 2011; Torino; (Motion Picture Expert Group or ISO/IEC JTC1/SC2911/WG11), No. N21450, XP030050013, 36 pp.

Misra et al., "New results for parallel decoding for Tiles," Joint Collaborative Team on Video Coding, JCTVC-F594 PowerPoint, Jul. 14-22, 2011, 10 slides.

Stockhammer Thomas et al., "Comments on H.26L NAL design", VCEG Meeting; Jan. 9, 2001-Jan. 12, 2001; Eibsee, DE; (Video Codingexperts Group of I TU-T SG .16), No. VCEG-L26, XP030003171, ISSN: 0000-046, 4 pp.

Wang, et al., "Flexible tile dependency and loop filtering control," Document JCTVC-G0520, Joint Collaborative Team on Video Coding (JCT-VC) of ITU-T SG16 WP3 and ISO/IEC JTC1/SC29/WG11, 8th Meeting: San Jose, CA , USA, Feb. 1-10, 2012, 7 pp.

Wang, et al., "Flexible tile dependency and loop filtering control", Document JCTVC-H0521r1, Joint Collaborative Team on Video Coding (JCT-VC) of ITU-T SG16 WP3 and ISO/IEC JTC1/SC29NVG11, 8th Meeting: San Jose, CA, USA, Feb. 1-10, 2012, 7 pp.

Wenger et al., "High level syntax for loop filter parameters," Joint Collaborative Team on Video Coding, JCTVC-F747 PowerPoint, Jul. 14-22, 2011, 7 slides.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability—PCT/US2012/063027, The International Bureau of WIPO—Geneva, Switzerland, Feb. 21, 2014, 12 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/063027, dated Dec. 4, 2013, 11 pp.

Anonymous, "Test Model under Consideration", Joint Collaborative Team on Video Coding, JCTVC-B205, Jul. 21-28, 2010,152 pp.

Bross et al., "WD4: Working Draft 4 of High-Efficiency Video Coding," Joint Collaborative Team on Video Coding, JCTVC-F803_d1, Jul. 14-22, 2011, 222 pp.

Clare et al., "Wavefront and Cabac Flush: Different Degrees of Parallelism Without Transcoding," Joint Collaborative Team on Video Coding, JCTVC-F275, Jul. 14-22, 2011, 11 pp.

Clare et al., "Wavefront Parallel Processing for HEVC Encoding and Decoding," Joint Collaborative Team on Video Coding, JCTVC-F274, Jul. 14-22, 2011, 16 pp.

(56) References Cited

OTHER PUBLICATIONS

Coban et al., "Evaluation of Entropy Slices", Joint Collaborative Team on Video Coding, JCTVC-D430, Jan. 20-28, 2011, 3 pp.

Fuldseth, "Replacing slices with tiles for high level parallelism", Joint Collaborative Team on Video Coding, JCTVC-D227, Jan. 20-28, 2011, 4 pp.

Fuldseth et al., "Tiles," Joint Collaborative Team on Video Coding, JCTVC-F335, Jul. 14-22, 2011, 15 pp.

Hang et al., "Towards the Next Video Standard: High Efficiency Video Coding," Proceedings of the Second APSIPA Annual Summit and Conference, Dec. 14-17, 2010, 10 pp.

Horowitz et al. "Generalized slices", Joint Collaborative Team on Video Coding, JCTVC-D378, Jan. 20-28, 2011, 7 pp.

Hsu et al., "Syntax for Leaf Coding Unit Aligned Slices", Joint Collaborative Team on Video Coding, JCTVC-D127, Jan. 20-28, 2011, 13 pp.

Misra et al.,"Lightweight slicing for entropy coding," Joint Collaborative Team on Video Coding, JCTVC-D070, Jan. 20-28, 2011, 7 pp.

Lambert et al., "Flexible macroblock ordering in H.264/AVC", Journal of Visual Communication and Image Representation, vol. 17, Apr. 1, 2006, 18 pp.

Misra et al., "New results for parallel decoding for Tiles," Joint Collaborative Team on Video Coding, JCTVC-F594, Jul. 14-22, 2011, 6 pp.

Misra et al., "Entropy Slices for Parallel Entropy Coding", Joint Collaborative Team on Video Coding, JCT-VC B111 PowerPoint, Jul. 14-22, 2011, 10 slides.

Misra et al., "Entropy Slices for Parallel Entropy Coding", Joint Collaborative Team on Video Coding, JCTVC-B111, Jul. 21-28, 2010, 6 pp.

Misra et al., "Entropy Slices for Parallel Entropy Coding", Joint Collaborative Team on Video Coding, JCTVC-C256, Oct. 7-15, 2010, 6 pp.

Francois et al. "Slices modifications for HEVC", Joint Collaborative Team on Video Coding, JCTVC-E222, Mar. 16-23, 2011, 8 pp.

Wenger et al., "Adaptation Parameter Set (APS)," Joint Collaborative Team on Video Coding, JCTVC-F747r3, Jul. 14-22, 2011, 10 pp.

Wiegand et al., "Overview of the H.264/AVC video coding standard", IEEE Transactions on Circuits and Systems for Video Technology, vol. 13, No. 7, Jul. 2003, 17 pp.

* cited by examiner

PADDING OF SEGMENTS IN CODED SLICE NAL UNITS

This application claims the benefit of U.S. Provisional Application No. 61/557,259, filed Nov. 8, 2011, the entire content of which is incorporated herein by reference. This application also claims the benefit of U.S. Provisional Application 61/555,932, filed Nov. 4, 2011.

TECHNICAL FIELD

This disclosure relates to video coding (i.e., encoding or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques perform spatial (intra-picture) prediction and/or temporal (inter-picture) prediction to reduce or remove redundancy inherent in video sequences. For block-based video coding, a video slice may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

SUMMARY

In general, this disclosure describes techniques for encoding and decoding video data. A video encoder may divide a picture into a plurality of picture partitions. The picture partitions include non-overlapping subsets of the treeblocks of the picture. Example types of picture partitions include tiles and wavefront parallel processing (WPP) waves. The video encoder may generate a coded slice network abstraction layer (NAL) unit that includes encoded representations of the treeblocks associated with a slice of the picture. The video encoder generates the coded slice NAL unit such that the coded treeblocks are grouped within the coded slice NAL unit by the picture partitions to which the treeblocks belong. The video encoder may pad one or more of the segments such that each of the segments begins on a byte boundary. A video decoder may decode coded treeblocks of the coded slice NAL unit.

In one aspect, this disclosure describes a method for encoding video data. The method comprises dividing a picture into a plurality of picture partitions. The picture has a plurality of treeblocks. The picture partitions are associated with non-overlapping subsets of the treeblocks of the picture. The method also comprises generating a coded slice NAL unit that includes encoded representations of the treeblocks that are associated with a slice of the picture, the encoded representations of the treeblocks grouped within the coded slice NAL unit into segments associated with different ones of the picture partitions, wherein one or more of the segments are padded such that each of the segments begins on a byte boundary.

In another aspect, this disclosure describes a method of decoding video data. The method comprises storing a coded slice NAL unit that includes encoded representations of treeblocks associated with a slice of a picture. The picture is partitioned into a plurality of picture partitions. The encoded representations of the treeblocks are grouped into segments associated with different ones of the picture partitions. One or more of the segments are padded such that each of the segments begins at a byte boundary. The method also comprises decoding the encoded representations of the treeblocks.

In another aspect, this disclosure describes a video encoding device that encodes video data. The video encoding device comprises one or more processors configured to divide a picture into a plurality of picture partitions. The picture has a plurality of treeblocks. The picture partitions are associated with non-overlapping subsets of the treeblocks of the picture. The one or more processors are also configured to generate a coded slice NAL unit that includes encoded representations of the treeblocks that are associated with a slice of the picture. The encoded representations of the treeblocks are grouped within the coded slice NAL unit into segments associated with different ones of the picture partitions. One or more of the segments are padded such that each of the segments begins on a byte boundary.

In another aspect, this disclosure describes a video decoding device that decodes video data. The video decoding device comprises a memory that stores a coded slice NAL unit that includes encoded representations of treeblocks associated with a slice of a picture. The picture is divided into a plurality of picture partitions. The encoded representations of the treeblocks are grouped into segments associated with different ones of the picture partitions. One or more of the segments are padded such that each of the segments begins at a byte boundary. The video decoding device also comprises one or more processors that are configured to decode the encoded representations of the treeblocks.

In another aspect, this disclosure describes a computer program product that comprises one or more computer-readable storage media that store instructions that, when executed by one or more processors, configure a video encoding device to divide a picture into a plurality of picture partitions. The picture has a plurality of treeblocks. The picture partitions are associated with non-overlapping subsets of the treeblocks of the picture. The instructions also configure the video encoding device to generate a coded slice NAL unit that includes encoded representations of the treeblocks that are associated with a slice of the picture. The encoded representations of the treeblocks are grouped within the coded slice NAL unit into segments associated with different ones of the picture partitions. One or more of the segments are padded such that each of the segments begins on a byte boundary.

In another aspect, this disclosure describes a computer program product that comprises one or more computer-readable storage media that store instructions that, when executed by one or more processors, configure a video decoding device to store a coded slice NAL unit that includes encoded representations of treeblocks associated with a slice of a picture.

The picture is divided into a plurality of picture partitions. The encoded representations of the treeblocks are grouped into segments associated with different ones of the picture partitions. One or more of the segments are padded such that each of the segments begins at a byte boundary. The instructions also configure the video decoding device to decode the encoded representations of the treeblocks.

In another aspect, this disclosure describes a video encoding device that encodes video data. The video encoding device comprises means for dividing a picture into a plurality of picture partitions. The picture has a plurality of treeblocks. The picture partitions are associated with non-overlapping subsets of the treeblocks of the picture. The video encoding device also comprises means for generating a coded slice NAL unit that includes encoded representations of the treeblocks that are associated with a slice of the picture. The encoded representations of the treeblocks are grouped within the coded slice NAL unit into segments associated with different ones of the picture partitions. One or more of the segments are padded such that each of the segments begins on a byte boundary.

In another aspect, this disclosure describes a video decoding device that decodes video data. The video decoding device comprises means for storing a coded slice NAL unit that includes encoded representations of treeblocks associated with a slice of a picture. The picture is divided into a plurality of picture partitions. The encoded representations of the treeblocks are grouped into segments associated with different ones of the picture partitions. One or more of the segments are padded such that each of the segments begins at a byte boundary. The video decoding device comprises means for decoding the encoded representations of the treeblocks.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram that illustrates an example coding order when a picture is partitioned into a plurality of tiles.

DETAILED DESCRIPTION

Figure 1:
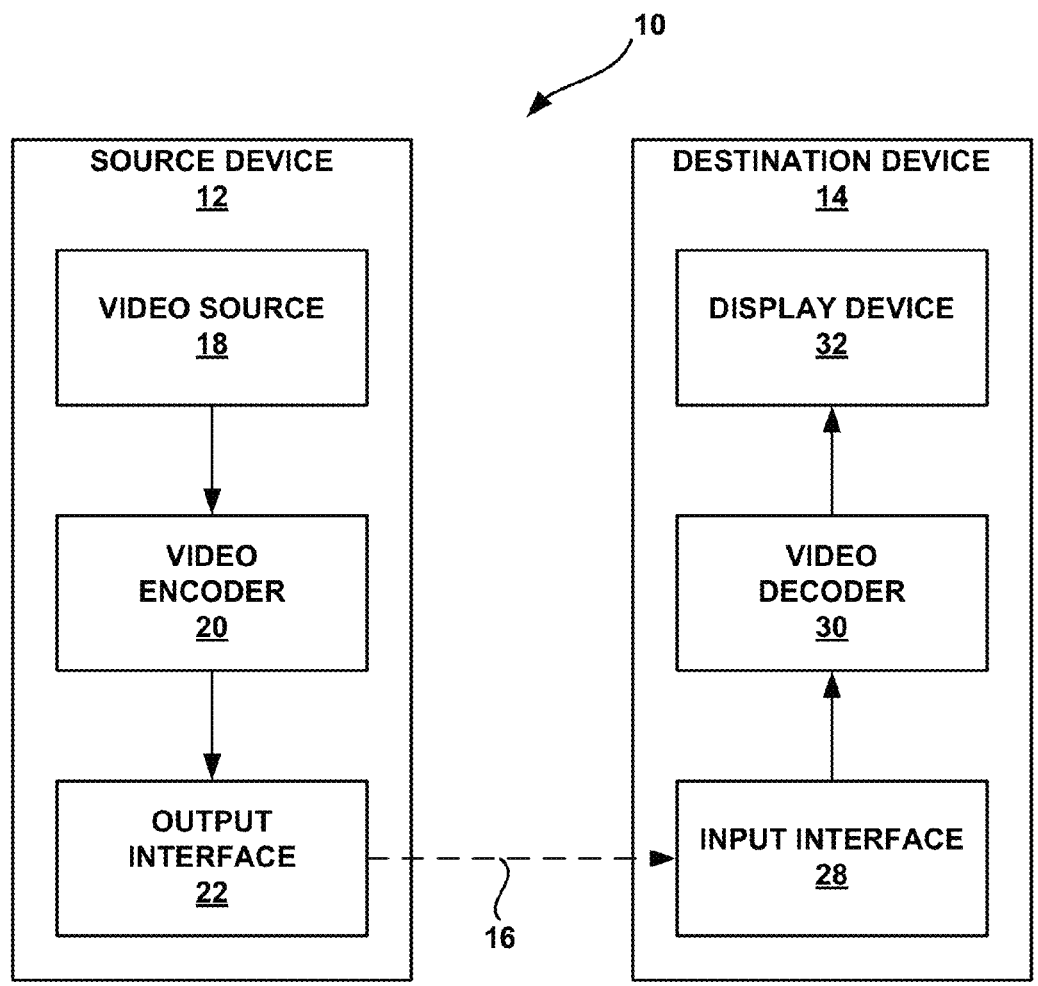
FIG. 1 is a block diagram illustrating an example video coding system that may utilize the techniques of this disclosure.

A picture includes a plurality of treeblocks. The treeblocks are associated with two-dimensional video blocks within the picture. A video encoder divides the picture into a plurality of picture partitions. For example, the video encoder may divide the picture into tiles or wavefront parallel processing (WPP) waves. In other words, this disclosure may use the term "picture partition" to refer generically to tiles or WPP waves. The picture partitions are associated with non-overlapping subsets of the treeblocks of the picture. For instance, each treeblock of the picture may be associated with exactly one of the picture partitions.

The video encoder may generate a coded slice Network Abstraction Layer (NAL) unit. The coded slice NAL unit may include encoded representations of each treeblock associated with a slice of the picture. This disclosure may refer to an encoded representation of a treeblock as a coded treeblock. A coded treeblock may include a sequence of bits that represent the video block associated with a treeblock. The sequence of bits in a coded treeblock may represent a sequence of syntax elements.

The video encoder may group the coded treeblocks within the coded slice NAL unit into segments. The segments are associated with different ones of the picture partitions. Each of the segments may be a consecutive series of bits, such as bits representing a series of one or more coded treeblocks and associated data. Thus, the coded slice NAL unit may include each coded treeblock associated with a first picture partition followed by each coded treeblock associated with a second picture partition, followed by each coded treeblock associated with a third picture partition, and so on.

In accordance with the techniques of this disclosure, the video encoder may pad one or more of the segments such that each of the segments begins on a byte boundary. When the video encoder pads a segment, the video encoder may append padding bits to the segment. The padding bits may not have any semantic meaning, but may serve to ensure that a next segment begins at a byte boundary. In this way, the video encoder may provide byte alignment of tiles or WPP waves when the tiles or WPP waves are included in one coded slice NAL unit for parallel processing purposes.

A video decoder may store the coded slice NAL unit in byte addressed memory. The video decoder may then assign two or more of the segments to different decoding threads that operate in parallel. Each decoding thread decodes the coded treeblocks of the segment assigned to the decoding thread. Because each of the segments begins at a byte boundary, the video decoder may provide a memory address of a segment to a decoding thread when assigning the segment to the decoding thread. In this way, ensuring that each of the segments begins at a byte boundary may enable the video decoder to decode the segments in parallel in a simpler fashion than when the segments may begin at non-byte-boundary positions.

This may stand in contrast to conventional video encoders and conventional video decoders that do not ensure that the segments begin at byte boundaries. Because the segments may not begin at byte boundaries, a conventional video decoder that uses byte-wise memory addressing may be unable to decode the coded treeblocks in the segments in parallel. A conventional video decoder may use bit-wise memory addressing or byte-wise plus bit-wise addressing to enable decoding the coded treeblocks in the segments in parallel but with increased implementation and computation complexities.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Furthermore, in the following description, the "current picture" may refer to a picture that is currently being encoded or decoded.

FIG. 1 is a block diagram that illustrates an example video coding system 10 that may utilize the techniques of this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives. Destination device 14 may access the encoded video data through a standard data connection, including an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A recent draft of the upcoming HEVC standard, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of May 1, 2012, is downloadable from: http://phenix.int-evey.fr/jct/doc_end_user/documents/8_San%20Jose/wg11/JCTVC-H1003-v22.zip, the entire content of which is incorporated herein by reference. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards, when picture partitioning techniques like tiles or wavefront parallel processing are included. The techniques of this disclosure, however, are not limited to any particular coding standard or technique. Other examples of video compression standards and techniques include MPEG-2, ITU-T H.263 and proprietary or open source compression formats such as VP8 and related formats, when picture partitioning techniques like tiles or wavefront parallel processing are included.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

As mentioned briefly above, video encoder 20 encodes video data. The video data may comprise one or more pictures. Each of the pictures is a still image forming part of a video. In some instances, a picture may be referred to as a video "frame" or a video "field". When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include sequence parameter sets, picture parameter sets, adaptation parameter sets, and other syntax structures. A sequence parameter set (SPS) may contain parameters applicable to zero or more sequences of pictures. Sequences of pictures may also be referred to as coded video sequences, as in H.264/AVC and HEVC. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU) or a coding treeblock. The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of consecutively coded treeblocks. In some instances, each of the slices may include an integer number of consecutively coded CUs. As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (i.e., encode) the treeblocks in the slice according to a raster scan order. In other words, video encoder 20 may encode the treeblocks of the slice in an order that proceeds from left to right across a topmost row of treeblocks in the slice, then proceeds from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on.

A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (i.e., the size of the CU) may range from 8×8 pixels up to the size of a video block of a treeblock (i.e., the size of the treeblock) with a maximum of 64×64 pixels or greater.

Video encoder 20 may perform encoding operations on (i.e., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (i.e., residual video blocks) associated with transform units (TUs) of the CU. Each TU of a CU may be associated with a different residual video block.

Video coder 20 may apply one or more transforms to residual video blocks associated with the TUs to generate transform coefficient blocks (i.e., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a sequence parameter set, a picture parameter set, a coded slice, one or more supplemental enhancement information (SEI) messages, an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video encoder 20 may divide the current picture into a plurality of picture partitions. The picture partitions may be associated with non-overlapping subsets of the treeblocks of the current picture. Video encoder 20 may divide the current picture into a plurality of picture partitions in various ways. As described below, video encoder 20 may divide the current picture into a plurality of tiles or into a plurality of wavefront parallel processing (WPP) waves. This disclosure may use the term "picture partition" to refer generically to both tiles and WPP waves. The process of dividing the current picture into picture partitions may be referred to as "partitioning" the current picture into picture partitions.

As mentioned above, video encoder 20 may divide the current picture into one or more tiles. Each of the tiles may comprise an integer number of treeblocks in the current picture. Video encoder 20 may divide the current picture into tiles by defining two or more vertical tile boundaries and two or more horizontal tile boundaries. Each vertical side of the current picture may be considered to be a vertical tile boundary. Each horizontal side of the current picture may be considered to be a horizontal tile boundary. For example, if video encoder 20 defines four vertical tile boundaries and three horizontal tile boundaries for the current picture, the current picture is divided into six tiles.

A video coder, such as video encoder 20 or video decoder 30, may code the tiles of the current picture according to raster scan order. Furthermore, when the video coder codes a tile, the video coder may code each treeblock within the tile according to a raster scan order. In this way, the video coder may code each treeblock of a given tile of the current picture before coding any treeblock of another tile of the current picture. Consequently, the order in which the video coder codes the treeblocks of the current picture may be different when the video coder partitions the current picture into multiple tiles than when the video coder does not partition the current picture into multiple tiles.

Furthermore, in some instances, the video coder may use information associated with spatially-neighboring CUs to perform intra prediction on a given CU in the current picture, so long as the given CU and the spatially-neighboring CUs belong to the same tile. The spatially-neighboring CUs are CUs that belong to the current slice of the current picture. In some instances, the video coder may use information associated with spatially-neighboring CUs to select a context for CABAC encoding a syntax element of the given CU, so long as the given CU and the spatially-neighboring CUs are within the same tile. Because of these restrictions, the video coder may be able to code in parallel treeblocks of multiple tiles.

In other examples, the video coder may code the current picture using wavefront parallel processing (WPP). When the video coder codes the current picture using WPP, the video coder may divide the treeblocks of the current picture into a plurality of "WPP waves." Each of the WPP waves may correspond to a different row of treeblocks in the current picture. When the video coder codes the current picture using WPP, the video coder may start coding a top row of treeblocks. When the video coder has coded two or more treeblocks of the top row, the video coder may start coding a second to top row of treeblocks in parallel with coding the top row of treeblocks. When the video coder has coded two or more treeblocks of the second to top row, the video coder may start coding a third to top row of treeblock in parallel with coding the higher rows of treeblocks. This pattern may continue down the rows of treeblocks in the current picture.

When the video coder is coding the current picture using WPP, the video coder may use information associated with spatially-neighboring CUs outside a current treeblock to perform intra prediction on a given CU in the current treeblock, so long as the spatially-neighboring CUs are left, above-left, above, or above-right of the current treeblock. If the current treeblock is the leftmost treeblock in a row other than the topmost row, the video coder may use information associated with the second treeblock of the immediately higher row to select a context for CABAC encoding a syntax element of the current treeblock. Otherwise, if the current treeblock is not the leftmost treeblock in the row, the video coder may use information associated with a treeblock to the left of the current treeblock to select a context for CABAC encoding a syntax element of the current treeblock. In this way, the video coder may initialize CABAC states of a row based on the CABAC states of the immediately higher row after encoding two or more treeblocks of the immediately higher row.

In some examples, when the video coder is coding the current picture using WPP, the only tile boundaries of the current picture are horizontal and vertical borders of the current picture. Thus, the only tile of the current picture may be the same size as the current picture. The video coder may divide the current picture, and hence the single tile of the current picture, into multiple WPP waves.

As mentioned above, video encoder 20 may generate a coded slice NAL unit that includes an encoded representation of a slice. The slice may be associated with an integer number of consecutively coded treeblocks. The coded slice NAL unit may include a slice header and slice data. The slice data may include encoded representations of each treeblock associated with the slice. Video encoder 20 may generate the coded slice NAL unit that such encoded representations of the treeblocks are grouped within the slice data into segments according to the picture partitions with which the treeblocks belong. For example, the coded slice NAL unit may include each coded treeblock associated with a first picture partition followed by each coded treeblock associated with a second picture partition, followed by each coded treeblock associated with a third picture partition, and so on.

In accordance with the techniques of this disclosure, video encoder 20 may pad one or more of the segments such that each of the segments begins on a byte boundary. The coded slice NAL unit may be divided into a series of bytes. A segment may begin on a byte boundary when a first bit of the segment is the first bit of one of the bytes of the coded slice NAL unit. Furthermore, a segment may be byte aligned if the first bit of a segment is the first bit of one of the bytes of the coded slice NAL unit. When video encoder 20 pads a segment, video encoder 20 may append padding bits to the segment. For instance, video encoder 20 may add one or more padding bits to a segment such that the number of bits in the segment is divisible by eight without leaving a remainder. The padding bits may not have any semantic meaning, but may serve to ensure that a next segment begins at a byte boundary.

When video decoder 30 receives the coded slice NAL unit, video encoder 30 may store the coded slice NAL unit in memory. To decode the picture partitions in parallel, video decoder 30 may assign the segments to different decoding threads that run in parallel. In order to assign the segments to different decoding threads, video decoder 30 may need to indicate memory addresses associated with the beginnings of the segments. Video decoder 30 may use byte-wise memory addressing. Accordingly, video decoder 30 may be unable to indicate the memory address associated with the start of a segment if the start of the segment occurs within a byte. Hence, video decoder 30 may not be able to decode the coded treeblocks in the segments in parallel if one or more of the segments begins within a byte. Alternatively, video decoder 30 may use bit-wise memory addressing or byte-wise plus bit-wise addressing to enable decoding the coded treeblocks in the segments in parallel but with increased implementation and computation complexities.

In this way, video encoder 20 may divide a picture into a plurality of picture partitions. The picture has a plurality of treeblocks. The picture partitions are associated with non-overlapping subsets of the treeblocks of the picture. Video encoder 20 may generate a coded slice NAL unit that includes encoded representations of the treeblocks that are associated with a slice of the picture. The encoded representations of the treeblocks are grouped within the coded slice NAL unit into segments associated with different ones of the picture partitions. One or more of the segments are padded such that each of the segments begins on a byte boundary.

Moreover, video decoder 30 may store a coded slice NAL unit that includes encoded representations of treeblocks associated with a slice of a picture. The picture may be divided into a plurality of picture partitions. The encoded representations of the treeblocks may be grouped into segments associated with different ones of the picture partitions. One or more of the segments are padded such that each of the segments begins at a byte boundary. Video decoder 30 may decode the encoded representations of the treeblocks. In some instances, video decoder 30 may decode the encoded representations of the treeblocks in two or more of the segments in parallel.

Figure 2:
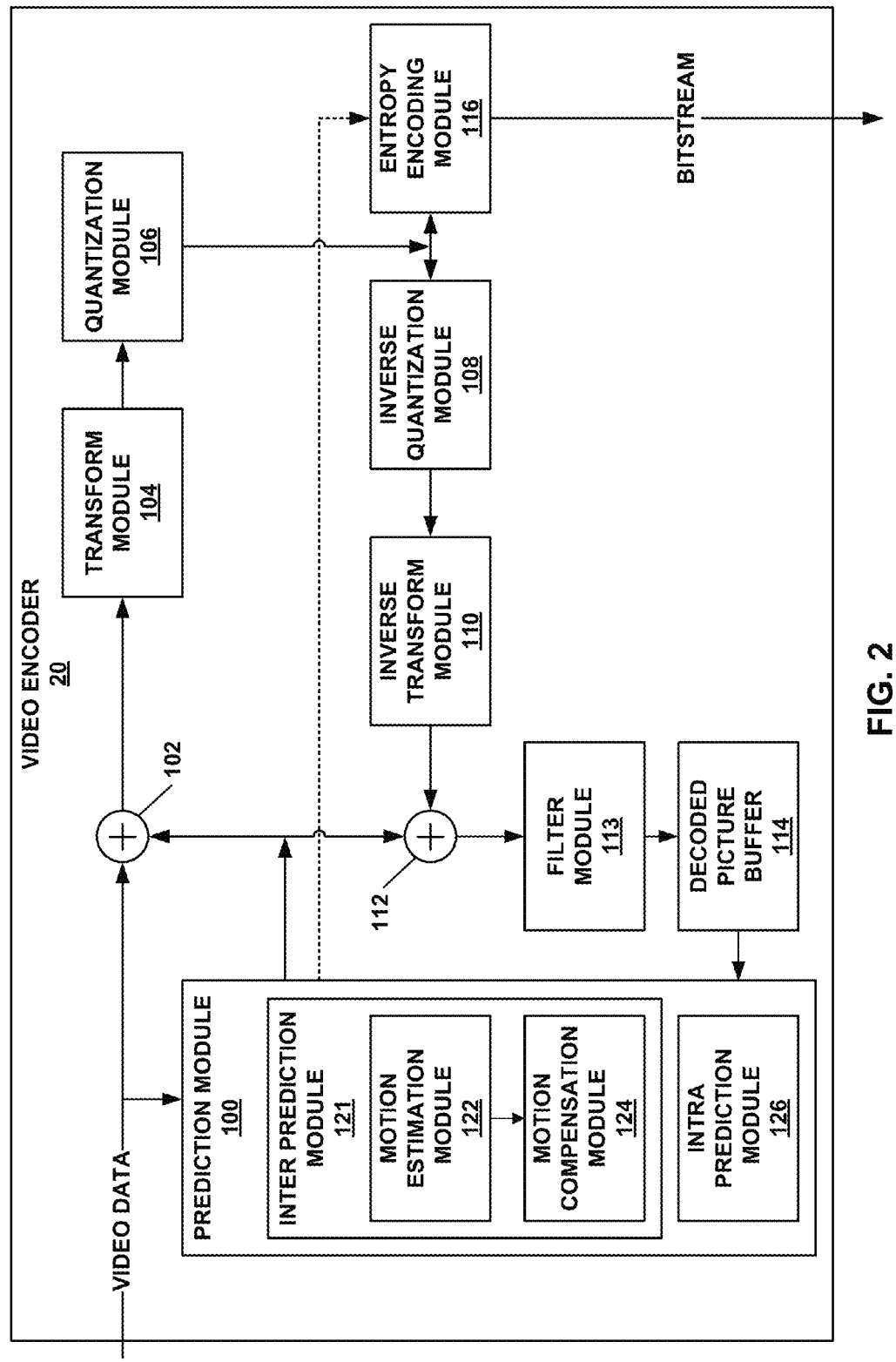
FIG. 2 is a block diagram illustrating an example video encoder that is configured to implement the techniques of this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a plurality of functional components. The functional components of video encoder 20 include a prediction module 100, a residual generation module 102, a transform module 104, a quantization module 106, an inverse quantization module 108, an inverse transform module 110, a reconstruction module 112, a filter module 113, a decoded picture buffer 114, and an entropy encoding module 116. Prediction module 100 includes an inter prediction module 121, motion estimation module 122, a motion compensation module 124, and an intra prediction module 126. In other examples, video encoder 20 may include more, fewer, or different functional components. Furthermore, motion estimation module 122 and motion compensation module 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction module 100 may perform quadtree partitioning on the video block of the treeblock to divide the video block into progressively smaller video blocks. Each of the smaller video blocks may be associated with a different CU. For example, prediction module 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction module 100 may generate a hierarchical quadtree data structure for the treeblock. For example, a treeblock may correspond to a root node of the quadtree data structure. If prediction module 100 partitions the video block of the treeblock into four sub-blocks, the root node has four child nodes in the quadtree data structure. Each of the child nodes corresponds to a CU associated with one of the sub-blocks. If prediction module 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (i.e., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction module 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction module 100 may perform geometric partitioning to partition the video block of a CU among PUs of the CU along a boundary that does not meet the sides of the video block of the CU at right angles.

Inter prediction module 121 may perform inter prediction on each PU of the CU. Inter prediction may provide temporal compression. To perform inter prediction on a PU, motion estimation module 122 may generate motion information for the PU. Motion compensation module 124 may generate a predicted video block for the PU based the motion information and decoded samples of pictures other than the picture associated with the CU (i.e., reference pictures). In this disclosure, a predicted video block generated by motion compensation module 124 may be referred to as an inter-predicted video block.

Slices may be I slices, P slices, or B slices. Motion estimation module 122 and motion compensation module 124 may perform different operations for a PU of a CU depending on whether the PU is in an I slice, a P slice, or a B slice. In an I slice, all PUs are intra predicted. Hence, if the PU is in an I slice, motion estimation module 122 and motion compensation module 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation module 122 performs the motion estimation operation with regard to a PU in a P slice, motion estimation module 122 may search the reference pictures in list 0 for a reference block for the PU. The reference block of the PU may be a set of samples, e.g., a block of samples, that most closely corresponds to the samples in the video block of the PU. Motion estimation module 122 may use a variety of metrics to determine how closely a set of samples in a reference picture corresponds to the samples in the video block of a PU. For example, motion estimation module 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation module 122 may generate a reference index that indicates the reference picture in list 0 containing the reference block and a motion vector that indicates a spatial displacement between the PU and the reference block. In various examples, motion estimation module 122 may generate motion vectors to varying degrees of precision. For example, motion estimation module 122 may generate motion vectors at one-quarter sample precision, one-eighth sample precision, or other fractional sample precision. In the case of fractional sample precision, reference block values may be interpolated from integer-position sample values in the reference picture. Motion estimation module 122 may output the reference index and the motion vector as the motion information of the PU. Motion compensation module 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation module 122 may perform uni-directional prediction or bi-directional prediction for the PU. When motion estimation module 122 performs uni-directional prediction for the PU, motion estimation module 122 may search the reference pictures of list 0 or list 1 for a reference block for the PU. Motion estimation module 122 may then generate a reference index that indicates the reference picture in list 0 or list 1 that contains the reference block and a motion vector that indicates a spatial displacement between the PU and the reference block. Motion estimation module 122 may output the reference index, a prediction direction indicator, and the motion vector as the motion information of the PU. The prediction direction indicator may indicate whether the reference index indicates a reference picture in list 0 or list 1. Motion compensation module 124 may generate the predicted video block of the PU based on the reference block indicated by the motion information of the PU.

When motion estimation module 122 performs bi-directional prediction for a PU, motion estimation module 122 may search the reference pictures in list 0 for a reference block for the PU and may also search the reference pictures in list 1 for another reference block for the PU. Motion estimation module 122 may then generate reference indexes that indicate the reference pictures in list 0 and list 1 containing the reference blocks and motion vectors that indicate spatial displacements between the reference blocks and the PU. Motion estimation module 122 may output the reference indexes and the motion vectors of the PU as the motion information of the PU. Motion compensation module 124 may generate the predicted video block of the PU based on the reference blocks indicated by the motion information of the PU.

In some instances, motion estimation module 122 does not output a full set of motion information for a PU to entropy encoding module 116. Rather, motion estimation module 122 may signal the motion information of a PU with reference to the motion information of another PU. For example, motion estimation module 122 may determine that the motion information of the PU is sufficiently similar to the motion information of a neighboring PU. In this example, motion estimation module 122 may indicate, in a syntax structure associated with the PU, a value that indicates to video decoder 30 that the PU has the same motion information as the neighboring PU. In another example, motion estimation module 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction module 126 may perform intra prediction on PUs of the CU. Intra prediction may provide spatial compression. When intra prediction module 126 performs intra prediction on a PU, intra prediction module 126 may generate prediction data for the PU based on decoded samples of other PUs in the same picture. The prediction data for the PU may include a predicted video block and various syntax elements. Intra prediction module 126 may perform intra prediction on PUs in I slices, P slices, and B slices.

To perform intra prediction on a PU, intra prediction module 126 may use multiple intra prediction modes to generate multiple sets of prediction data for the PU. When intra prediction module 126 uses an intra prediction mode to generate a set of prediction data for the PU, intra prediction module 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction module 126 may use various numbers of intra prediction modes, e.g., 33 directional intra prediction modes, depending on the size of the PU.

Prediction module 100 may select the prediction data for a PU from among the prediction data generated by motion compensation module 124 for the PU or the prediction data generated by intra prediction module 126 for the PU. In some examples, prediction module 100 selects the prediction data for the PU based on rate/distortion metrics of the sets of prediction data.

If prediction module 100 selects prediction data generated by intra prediction module 126, prediction module 100 may signal the intra prediction mode that was used to generate the prediction data for the PUs, i.e., the selected intra prediction mode. Prediction module 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction module 100 may generate a syntax element to indicate that the selected intra prediction mode is the same as the intra prediction mode of the neighboring PU.

After prediction module 100 selects the prediction data for PUs of a CU, residual generation module 102 may generate residual data for the CU by subtracting the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction module 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform module 104 may generate one or more transform coefficient blocks for each TU of a CU by applying one or more transforms to a residual video block associated with the TU. Each of the transform coefficient blocks may be a 2D matrix of transform coefficients. Transform module 104 may apply various transforms to the residual video block associated with a TU. For example, transform module 104 may apply a discrete cosine transform (DCT), a directional transform, or a conceptually similar transform to the residual video block associated with a TU.

After transform module 104 generates a transform coefficient block associated with a TU, quantization module 106 may quantize the transform coefficients in the transform coefficient block. Quantization module 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization module 108 and inverse transform module 110 may apply inverse quantization and inverse transforms to the transform coefficient block, respectively, to reconstruct a residual video block from the transform coefficient block. Reconstruction module 112 may add the reconstructed residual video block to corresponding samples from one or more predicted video blocks generated by prediction module 100 to produce a reconstructed video block associated with a TU. By reconstructing video blocks for each TU of a CU in this way, video encoder 20 may reconstruct the video block of the CU.

After reconstruction module 112 reconstructs the video block of a CU, filter module 113 may perform a deblocking operation to reduce blocking artifacts in the video block associated with the CU. After performing the one or more deblocking operations, filter module 113 may store the reconstructed video block of the CU in decoded picture buffer 114. Motion estimation module 122 and motion compensation module 124 may use a reference picture that contains the reconstructed video block to perform inter prediction on PUs of subsequent pictures. In addition, intra prediction module 126 may use reconstructed video blocks in decoded picture buffer 114 to perform intra prediction on other PUs in the same picture as the CU.

Entropy encoding module 116 may receive data from other functional components of video encoder 20. For example, entropy encoding module 116 may receive transform coefficient blocks from quantization module 106 and may receive syntax elements from prediction module 100. When entropy encoding module 116 receives the data, entropy encoding module 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding module 116 may output a bitstream that includes the entropy encoded data.

As part of performing an entropy encoding operation on data, entropy encoding module 116 may select a context model. If entropy encoding module 116 is performing a CABAC operation, the context model may indicate estimates of probabilities of particular bins having particular values. In the context of CABAC, the term "bin" is used to refer to a bit of a binarized version of a syntax element.

Video encoder 20 may generate a coded slice NAL unit for each slice of the current picture. The coded slice NAL unit for a slice may include a slice header and slice data. The slice data may include a plurality of segments. Each of the segments includes coded treeblocks associated with a different picture partition. Video encoder 20 may pad the segments such that each of the segments begins at a byte boundary within the slice data. For example, the segments in a coded slice NAL unit may include a given segment. In this example, video encoder 20 may generate the coded slice NAL unit at least in part by performing a padding operation that appends bits to the given segment if a next treeblock is inside the current slice and is associated with a different picture partition than the given segment.

In some examples, video encoder 20 may generate the slice header of a coded slice NAL unit such that the slice header indicates entry points for the segments in the slice data of the coded slice NAL unit. The entry points may indicate the positions within the slice data of the segments. For example, the entry points may indicate byte offsets of the segments. In this example, the byte offsets may be relative to the first bit of the coded slice NAL unit, the first bit of the slice data, or another bit in the coded slice NAL unit. In another example, the entry points may indicate the numbers of bits or bytes within each of the segments. In some examples, the slice header does not indicate an entry point for a first segment in the slice data.

In some examples, video encoder 20 may determine whether a flag has a first value (e.g., 1). If the flag has the first value, video encoder 20 may pad one or more of the segments such that each segment begins at a byte boundary. When the flag has a second value (e.g., 0), video encoder 20 does not pad the segments. As a result, the segments may or may not begin at byte-aligned positions. In such examples, a sequence parameter set, a picture parameter set, an adaptation parameter set, or a slice header may include the flag. Thus, in some examples, video encoder 20 may generate a parameter set associated with the current picture, the parameter set including a flag. When the flag has a first value, one or more of the segments are padded such that the segments begin at byte boundaries. When the flag has a second value, the segments may or may not begin at byte boundaries.

Furthermore, in some examples, video encoder 20 may partition the current picture into a plurality of tiles. If video encoder 20 allows in-picture prediction across tile boundaries (i.e., when two or more of tiles are dependent on each other), video encoder 20 does not pad the segments. As a result, the segments may or may not begin at byte-aligned positions. However, if video encoder 20 does not allow in-picture prediction across tile boundaries, video encoder 20 may pad one or more of the segments such that each of the segments begins at a byte boundary. Thus, video encoder 20 may generate a coded slice NAL unit at least in part by performing a padding operation that ensures that the segments begin at byte boundaries only after determining that the tiles are independent of one another.

Figure 3:
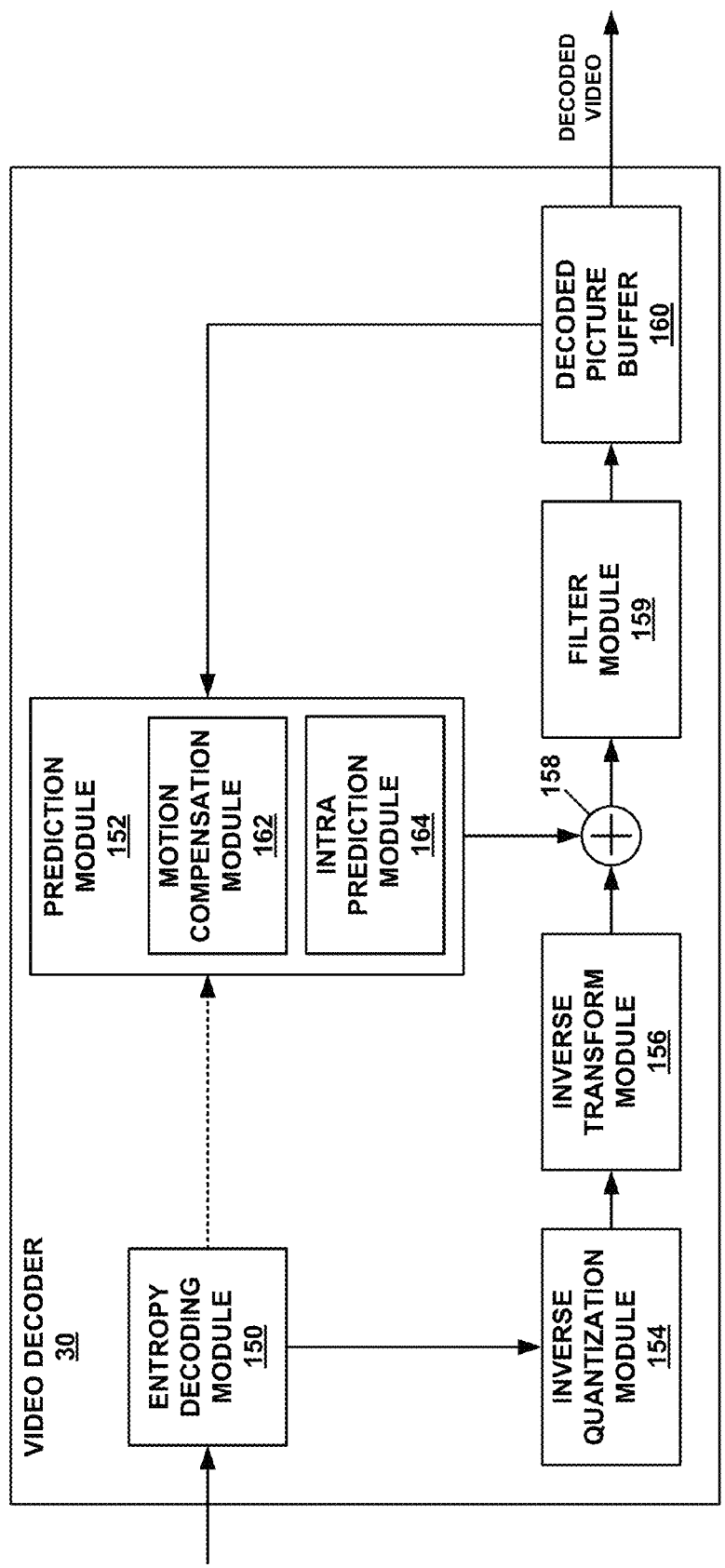
FIG. 3 is a block diagram illustrating an example video decoder that is configured to implement the techniques of this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes a plurality of functional components. The functional components of video decoder 30 include an entropy decoding module 150, a prediction module 152, an inverse quantization module 154, an inverse transform module 156, a reconstruction module 158, a filter module 159, and a decoded picture buffer 160. Prediction module 152 includes a motion compensation module 162 and an intra prediction module 164. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding module 150 may perform a parsing operation on the bitstream. As a result of performing the parsing operation on the bitstream, entropy decoding module 150 may extract syntax elements from the bitstream. As part of performing the parsing operation, entropy decoding module 150 may entropy decode entropy encoded syntax elements in the bitstream. Prediction module 152, inverse quantization module 154, inverse transform module 156, reconstruction module 158, and filter module 159 may perform a reconstruction operation that generates decoded video data based on the syntax elements extracted from the bitstream.

As discussed above, the bitstream may comprise a series of NAL units. The NAL units of the bitstream may include sequence parameter set NAL units, picture parameter set NAL units, SEI NAL units, and so on. As part of performing the parsing operation on the bitstream, entropy decoding module 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, video decoder 30 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice.

The slice data of a coded slice NAL unit may include multiple segments. Each of the segments may include coded treeblocks associated with a different picture partition (e.g., a tile or a WPP wave). One or more of the segments in the slice data may be padded such that each of the segments begins at a byte boundary. The slice header of the coded slice NAL unit may indicate entry points for the segments. In this case, because the segments always begin at byte boundaries, video decoder 30 may be able to assign different ones of the segments to different decoding threads in a simple fashion by using byte-wise memory addressing. The different decoding threads may parse the coded treeblocks of the segments and reconstruct the video data associated with the corresponding treeblocks in parallel.

As part of extracting the slice data from coded slice NAL units, entropy decoding module 150 may perform parsing operations that extract syntax elements from coded CUs. The extracted syntax elements may include syntax elements associated with transform coefficient blocks. Entropy decoding module 150 may then perform CABAC decoding operations on some of the syntax elements.

After entropy decoding module 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization module 154 may inverse quantize, i.e., de-quantize, a transform coefficient block associated with the TU. Inverse quantization module 154 may inverse quantize the transform coefficient block in a manner similar to the inverse quantization processes proposed for HEVC or defined by the H.264 decoding standard. Inverse quantization module 154 may use a quantization parameter QP calculated by video encoder 20 for a CU of the transform coefficient block to determine a degree of quantization and, likewise, a degree of inverse quantization for inverse quantization module 154 to apply.

After inverse quantization module 154 inverse quantizes a transform coefficient block, inverse transform module 156 may generate a residual video block for the TU associated with the transform coefficient block. Inverse transform module 156 may apply an inverse transform to the transform coefficient block in order to generate the residual video block for the TU. For example, inverse transform module 156 may apply an inverse DCT, an inverse integer transform, an inverse Karhunen-Loeve transform (KLT), an inverse rotational transform, an inverse directional transform, or another inverse transform to the transform coefficient block.

In some examples, inverse transform module 156 may determine an inverse transform to apply to the transform coefficient block based on signaling from video encoder 20. In such examples, inverse transform module 156 may determine the inverse transform based on a signaled transform at the root node of a quadtree for a treeblock associated with the transform coefficient block. In other examples, inverse transform module 156 may infer the inverse transform from one or more coding characteristics, such as block size, coding mode, or the like. In some examples, inverse transform module 156 may apply a cascaded inverse transform.

In some examples, motion compensation module 162 may refine the predicted video block of a PU by performing interpolation based on interpolation filters. Identifiers for interpolation filters to be used for motion compensation with sub-sample precision may be included in the syntax elements. Motion compensation module 162 may use the same interpolation filters used by video encoder 20 during generation of the predicted video block of the PU to calculate interpolated values for sub-integer samples of a reference block. Motion compensation module 162 may determine the interpolation filters used by video encoder 20 according to received syntax information and use the interpolation filters to produce the predicted video block.

If a PU is encoded using intra prediction, intra prediction module 164 may perform intra prediction to generate a predicted video block for the PU. For example, intra prediction module 164 may determine an intra prediction mode for the PU based on syntax elements in the bitstream. The bitstream may include syntax elements that intra prediction module 164 may use to determine the intra prediction mode of the PU.

In some instances, the syntax elements may indicate that intra prediction module 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction module 164 may then use the intra prediction mode to generate prediction data (e.g., predicted samples) for the PU based on the video blocks of spatially neighboring PUs.

Reconstruction module 158 may use the residual video blocks associated with TUs of a CU and the predicted video blocks of the PUs of the CU, i.e., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction module 158 reconstructs the video block of the CU, filter module 159 may perform a deblocking operation to reduce blocking artifacts associated with the CU. After filter module 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Figure 4:
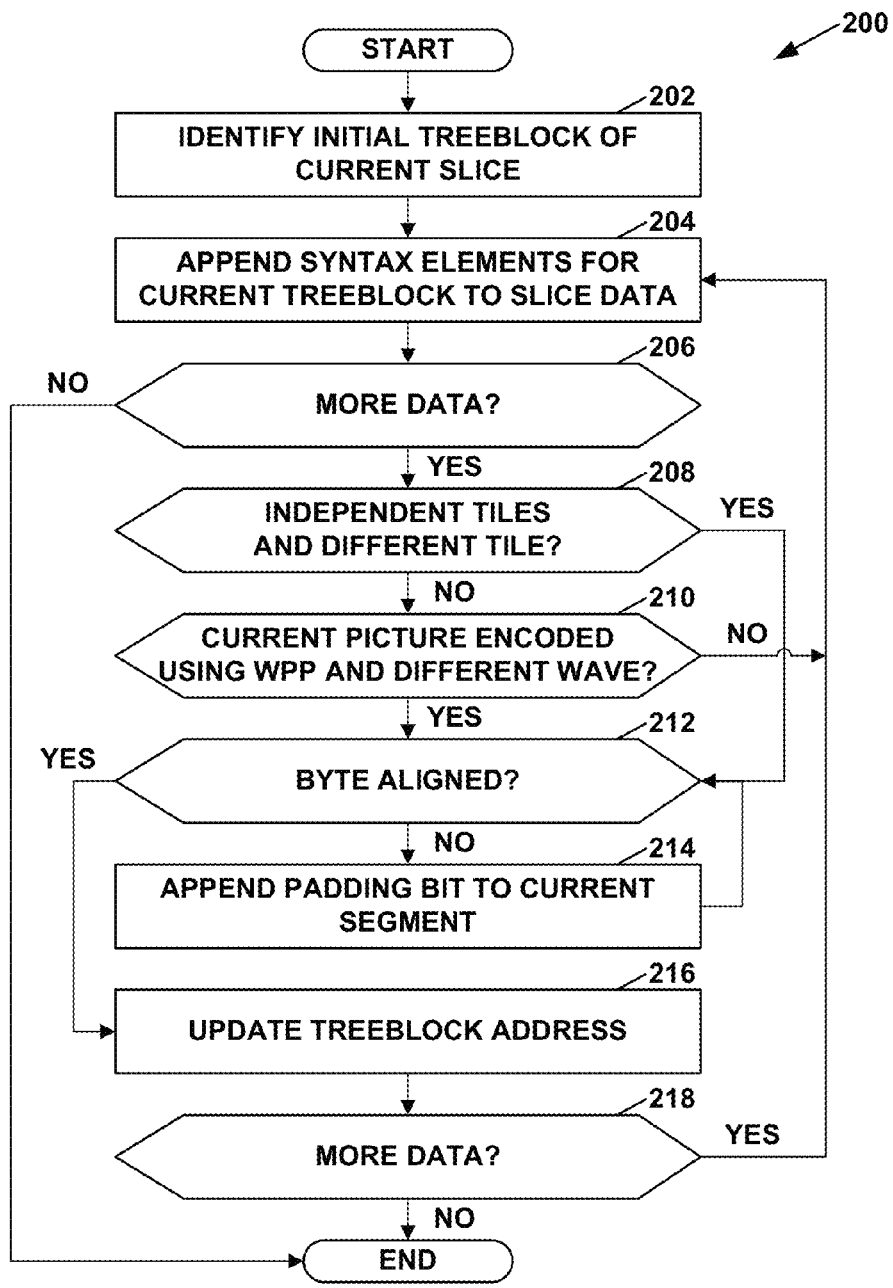
FIG. 4 is a flowchart that illustrates an example operation to generate slice data for a slice of a picture.

FIG. 4 is a flowchart that illustrates an example operation 200 to generate slice data for a slice. A video encoder, such as video encoder 20 (FIGS. 1 and 2), may perform operation 200. The example of FIG. 4 is merely one example. Other example operations may generate slice data in other ways.

After the video encoder starts operation 200, the video encoder may initialize a treeblock address such that the treeblock address identifies an initial treeblock of a current slice (202). The current slice may be a slice that the video encoder is currently encoding. The initial treeblock of the current slice may be the first treeblock associated with the current slice according to a treeblock coding order for the current picture. For ease of explanation, this disclosure may refer to the treeblock identified by the treeblock address as the current treeblock.

The video encoder may append syntax elements for the current treeblock to the slice data of a coded slice NAL unit for the current slice (204). The syntax elements for the current treeblock may include syntax elements in the quadtree of the current treeblock. Syntax elements in the quadtree of the current treeblock may include syntax elements that indicate intra prediction modes, motion information, syntax elements that indicate transform coefficient levels, and so on.

Furthermore, the video encoder may determine whether there is more data in the current slice (206). There may be more data in the current slice if the treeblock indicated by the treeblock address is within the current slice. In response to determining that there is no more data in the current slice ("NO" of 206), the video encoder may end operation 200 because the video encoder has added all of the necessary syntax elements to the slice data.

The video encoder may determine whether there is more data in the current slice in various ways. For example, the video encoder may invoke a function "coding_tree( )" to output the syntax elements for a treeblock. In this example, the function "coding_tree( )" may return a "moreDataFlag" that indicates whether there is more data in the current slice.

In response to determining that there is more data associated with the current slice ("YES" of 206), the video encoder may determine whether tiles of the current picture are independent and whether the next treeblock of the current slice is in a different tile than the current treeblock of the current slice (208). As described above, the tiles of a picture may be independent if in-picture prediction (e.g., intra prediction, inter prediction using data in the current picture, and CABAC context selection based on data from other tiles of the current picture) is prohibited. The video encoder may determine whether the tiles of the current picture are independent in various ways. For example, a sequence parameter set associated with the current picture may include a syntax element "tile_boundary_independence_idc." In this example, if "tile_boundary_independence_idc" is equal to 0, the tiles of the current picture are not independent and in-picture prediction across tile boundaries is allowed. If "tile_boundary_independence_idc" is equal to 0, in-picture prediction across slice boundaries may still be prohibited. If "tile_boundary_independence_idc" is equal to 1, the tiles of the current picture are independent and in-picture prediction across tile boundaries is not allowed.

The video encoder may determine in various ways whether the next treeblock of the current slice is in a different tile than the current treeblock of the current slice. For example, the video encoder may determine the treeblock address of the next treeblock of the current slice. In this example, the video encoder may invoke a function "NewTile( . . . )" that takes the treeblock address of the next treeblock as a parameter and returns a value "newTileFlag" that indicates whether the next treeblock is in a different tile than the current treeblock.

If the tiles of the current picture are not independent or the next treeblock is not in a different tile than the current treeblock ("NO" of 208), the video encoder may determine whether the current picture is being encoded using WPP and the next treeblock of the current slice is in a different WPP wave than the current treeblock of the current slice (210). The video encoder may determine in various ways whether the next treeblock of the current slice is in a different WPP wave than the current treeblock of the current slice. For example, the video encoder may determine the treeblock address of the next treeblock of the current slice. In this example, the video encoder may invoke a function "NewWave( . . . )" that takes the treeblock address of the next treeblock as a parameter and returns a value "newWaveFlag" that indicates whether the next treeblock is in a different WPP wave than the current treeblock.

In response to determining that the current picture is being encoded using WPP and the next treeblock is in a different WPP wave than the current treeblock ("YES" of 210) or in response to determining that the tiles of the current picture are independent and the next treeblock is in a different tile than the current treeblock ("YES" of 208), the video encoder may determine whether the current segment is byte aligned (212). In other words, the video encoder may determine whether the current segment ends on a byte boundary. The current segment is the segment associated with the picture partition (e.g., the or WPP wave) with which the current treeblock is associated. In response to determining that the current segment is not byte aligned ("NO" of 212), the video encoder may append a padding bit to the end of the current segment (214). The padding bit may have various values. For example, the padding bit may always have a value equal to 1. In other examples, the padding bit may always have a value equal to 0.

After appending the padding bit to the end of the current segment, the video encoder may again determine whether the current segment is byte aligned (212). In this way, the video encoder may continue appending padding bits to the end of the slice data until the current segment is byte aligned.

Figure 7:
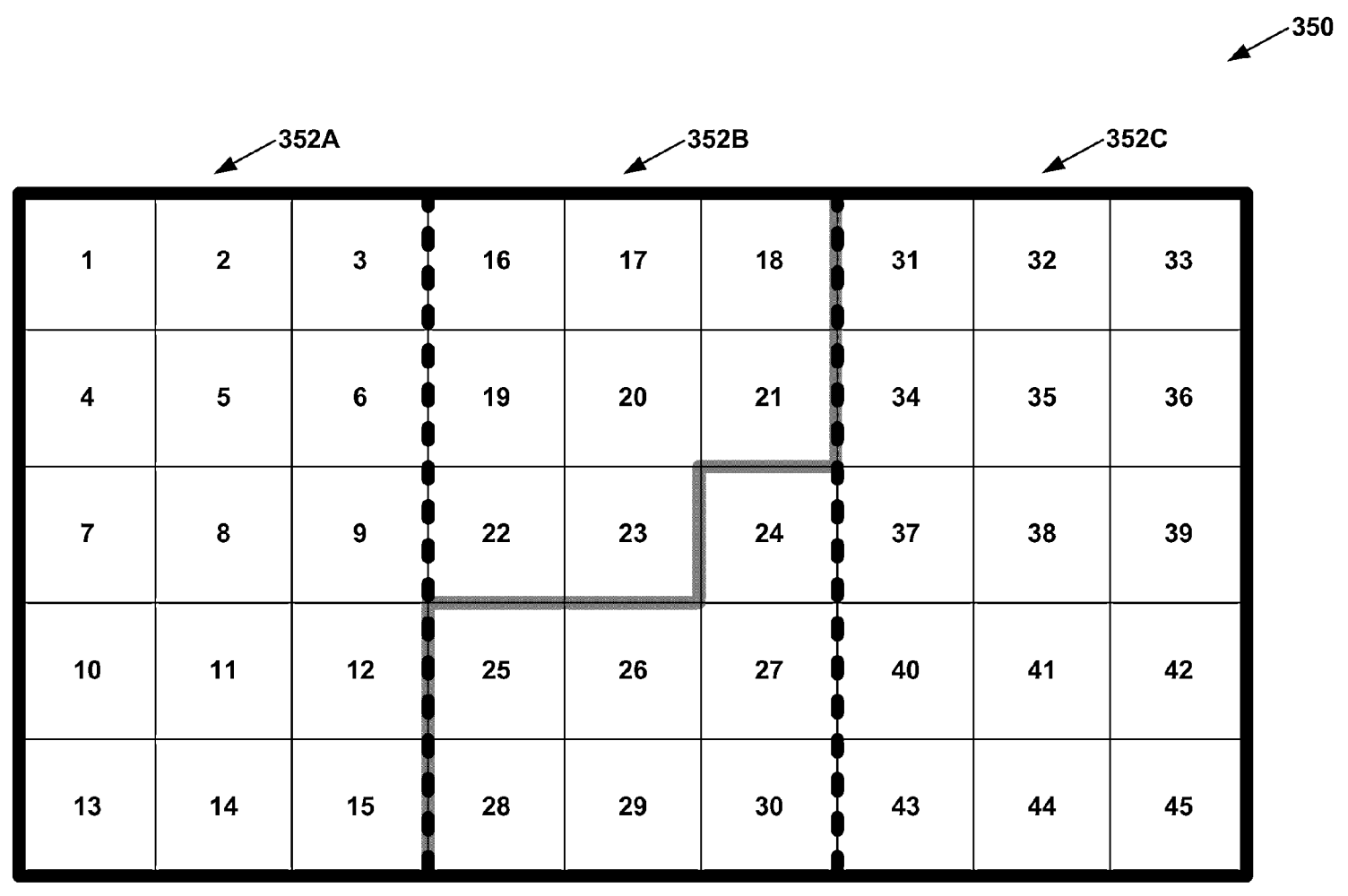

In response to determining that the slice data is byte aligned ("YES" of 212), the video encoder may update the treeblock address (216). The video encoder may update the treeblock address such that the treeblock address indicates the next treeblock according to a treeblock coding order of the current picture. For instance, when the video encoder updates the treeblock address, the treeblock address may identify a treeblock to the right of the treeblock previously indicated by the treeblock address. FIG. 7, described in detail below, is a conceptual diagram that illustrates an example treeblock coding order for a picture that is partitioned into multiple tiles.

After updating the treeblock address, the video encoder may determine whether there is more data in the current slice (218). In response to determining that there is more data in the current slice ("YES" of 218) or in response to determining that the current picture is not being encoded using WPP and the next treeblock is not in a different tile than the current treeblock ("NO" of 210), the video encoder may append the syntax elements for the current treeblock to the slice data (204). In this way, the video encoder may append the syntax elements for each treeblock of the current slice to the slice data and may ensure that segments associated with different picture partitions are padded such that the segments begin at byte boundaries.

In response to determining that there is no more data in the current slice ("NO" of 218), the video encoder may end operation 200 because the video encoder may have appended all of the syntax elements of the current slice to the slice data.

Figure 5:
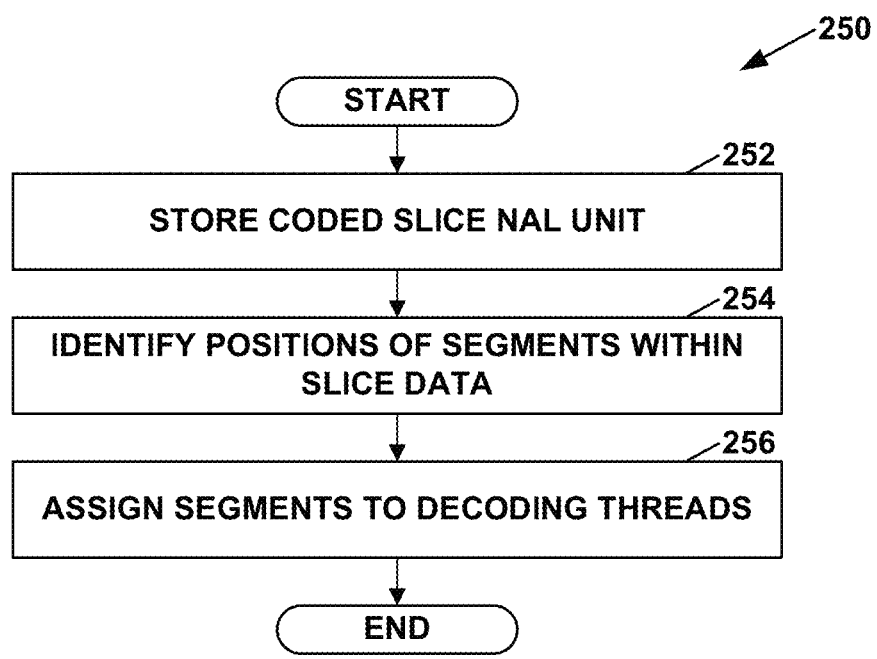
FIG. 5 is a flowchart that illustrates an example operation to decode a coded slice NAL unit.

FIG. 5 is a flowchart that illustrates an example operation 250 to decode a coded slice NAL unit. A video decoder, such as video decoder 30 (FIGS. 1 and 3), may perform operation 250. The example of FIG. 5 is merely one example. Other example operations may perform other operations to decode coded slice NAL units.

In the example of FIG. 5, the video decoder may store a coded slice NAL unit in byte addressed memory (252). The coded slice NAL unit may include a slice header and slice data. The slice data may include a plurality of segments. One or more of the segments may be padded such that each segment begins at a byte boundary.

After storing the coded slice NAL unit in memory, the video decoder may identify positions of the segments within the slice data of the coded slice NAL unit (254). The video decoder may identify the positions of the segments in various ways. For example, the video decoder may identify the positions of the segments based on syntax elements in the slice header of the coded slice NAL unit that indicate byte offsets of the segments. In this example, the slice header may not include a byte offset for the first segment of the slice data because the position of the first segment may immediately follow the end of the slice header. In another example, the video decoder may identify the positions of the segments based on entry point markers in the slice data. The entry point markers may be values disposed between the segments.

After identifying the positions of the segments within the slice data, the video decoder may assign two or more of the segments to two or more different decoding threads (256). Each of the decoding threads may parse the syntax elements of coded treeblocks in the segment assigned to the decoding thread and reconstruct video blocks for the corresponding treeblocks as described above.

Figure 6:
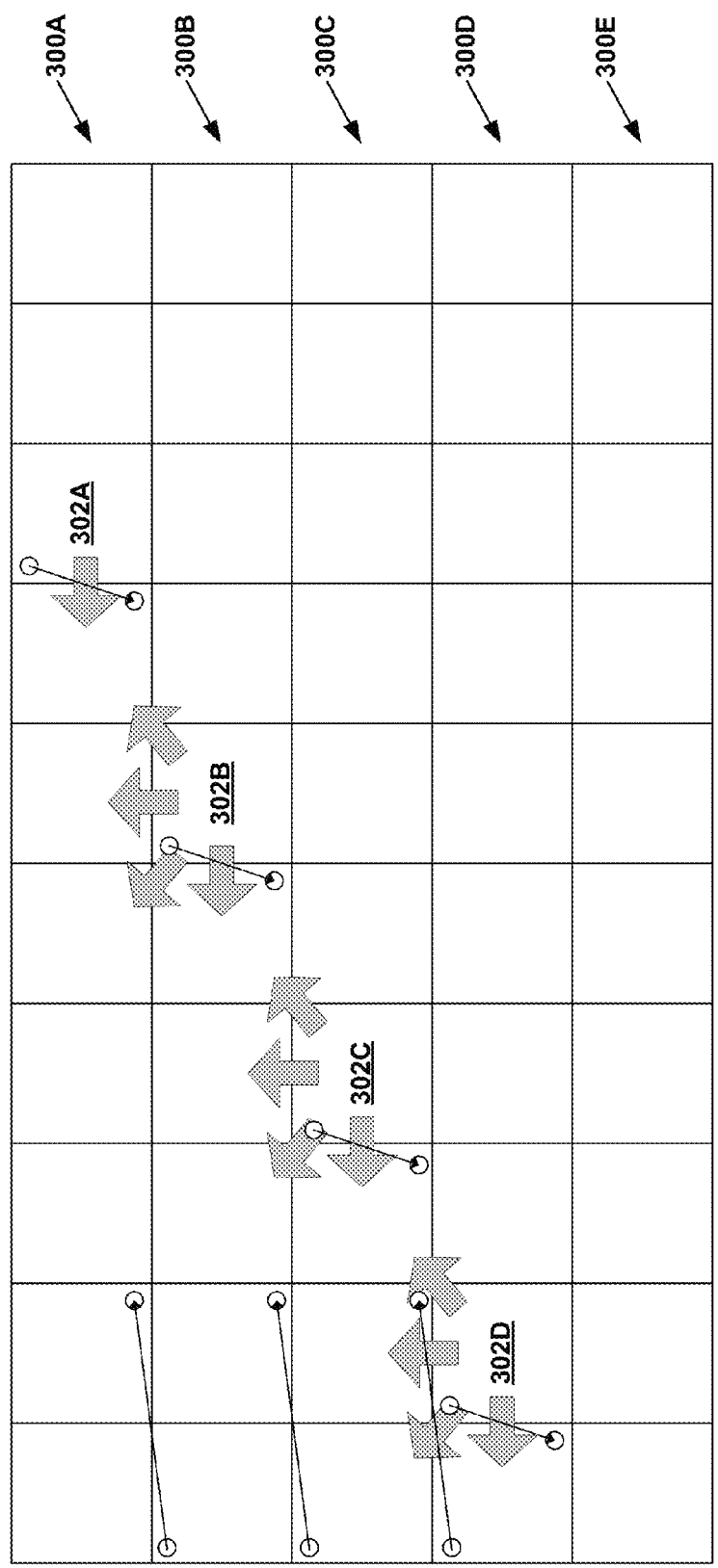
FIG. 6 is a conceptual diagram that illustrates wavefront parallel processing.

FIG. 6 is a conceptual diagram that illustrates wavefront parallel processing. As described above, a picture may be partitioned into video blocks, each of which is associated a treeblock. FIG. 6 illustrates the video blocks associated with the treeblocks as a grid of white squares. The picture includes treeblock rows 300A-300E (collectively, "treeblock rows 300").

A first thread may be coding treeblocks in treeblock row 300A. Concurrently, other threads may be coding treeblocks in treeblock rows 300B, 300C, and 300D. In the example of FIG. 6, the first thread is currently coding a treeblock 302A, a second thread is currently coding a treeblock 302B, a third thread is currently coding a treeblock 302C, and a fourth thread is currently coding a treeblock 302D. This disclosure may refer to treeblocks 302A, 302B, 302C, and 302D collectively as "current treeblocks 302." Because the video coder may begin coding a treeblock row after more than two treeblocks of an immediately higher row have been coded, current treeblocks 302 are horizontally displaced from each other by the widths of two treeblocks.

In the example of FIG. 6, the threads may use data from treeblocks indicated by the thick gray arrows when performing intra prediction or inter prediction for CUs in current treeblocks 302. (When the threads perform inter prediction for CUs, the threads may also use data from one or more reference frames.) When a thread codes a given treeblock, the thread may select one or more CABAC contexts based on information associated with previously coded treeblocks. The thread may use the one or more CABAC contexts to perform CABAC coding on syntax elements associated with the first CU of the given treeblock. If the given treeblock is not the leftmost treeblock of a row, the thread may select the one or more CABAC contexts based on information associated with a last CU of the treeblock to the left of the given treeblock. If the given treeblock is the leftmost treeblock of a row, the thread may select the one or more CABAC contexts based on information associated with a last CU of a treeblock that is above and two treeblocks right of the given treeblock. The threads may use data from the last CUs of the treeblocks indicated by the thin black arrows to select CABAC contexts for the first CUs of current treeblocks 302.

FIG. 7 is a conceptual diagram that illustrates an example treeblock coding order for a picture 350 that is partitioned into multiple tiles 352A, 352B, and 352C. Each square white block in picture 350 represents a video block associated with a treeblock. The thick vertical dashed lines indicate example vertical tile boundaries. The thick gray line indicates an example slice boundary.

The numbers in the video blocks indicate positions of the corresponding treeblocks (LCUs) in a treeblock coding order for picture 350. As illustrated in the example of FIG. 7, each of the treeblocks in the leftmost tile 352A occurs in the treeblock coding order before any treeblock in the middle tile 352B. Each of the treeblocks in the middle tile 352B occurs in the treeblock coding order before any treeblock in the rightmost tile 352C. Within each of tiles 352A, 352B, and 352C, the treeblocks are coded according to a raster scan order.

A video encoder may generate two coded slice NAL units for picture 350. The first coded slice NAL unit may be associated with the left slice of picture 350. The first coded slice NAL unit may include encoded representations of treeblocks 1-23. The slice data of the first coded slice NAL unit may include two segments. The first segment may include the encoded representations of treeblocks 1-15. The second segment may include the encoded representations of treeblocks 16-30. In accordance with the techniques of this disclosure, the first segment may be padded such that the second segment begins at a byte boundary.

A second coded slice NAL unit may be associated with the right slice of picture 350. The second coded slice NAL unit may include encoded representations of treeblocks 24-45. The slice data of the second coded slice NAL unit may include two segments. The first segment may include the encoded representations of treeblocks 24-30. The second segment may include the encoded representations of treeblocks 31-45. The first segment may be padded such that the second segment begins at a byte boundary.

Figure 8:
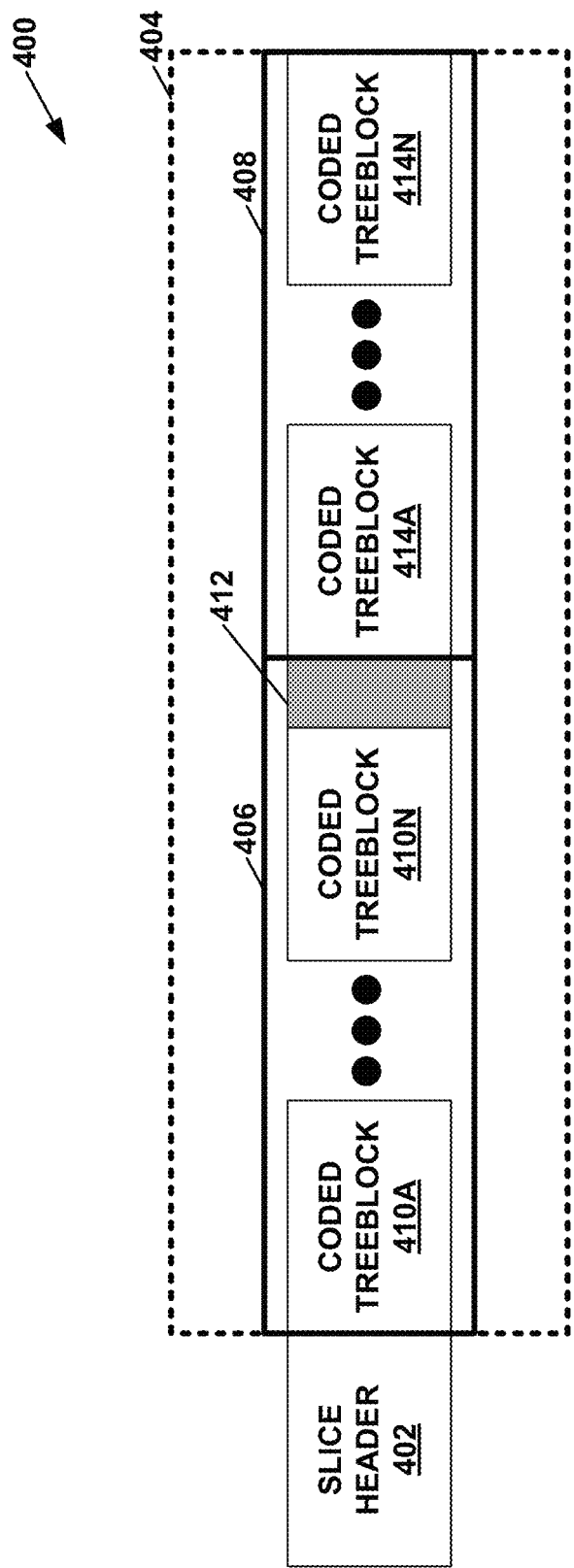
FIG. 8 is a conceptual diagram that illustrates an example coded slice NAL unit.

FIG. 8 is a conceptual diagram that illustrates an example coded slice NAL unit 400. As illustrated in the example of FIG. 8, coded slice NAL unit 400 includes a slice header 402 and slice data 404. Slice data 404 includes a first segment 406 and a second segment 408. Segment 406 includes coded treeblocks 410A-410N and padding data 412. Segment 408 includes coded treeblocks 414A-414N.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data, the method comprising:
   dividing a picture into a plurality of picture partitions, the picture having a plurality of treeblocks, the picture partitions associated with non-overlapping subsets of the treeblocks of the picture; and
   generating a coded slice network abstraction layer (NAL) unit that includes encoded representations of the treeblocks that are associated with a slice of the picture, the encoded representations of the treeblocks grouped within the coded slice NAL unit into segments associated with different ones of the picture partitions, wherein:
      one or more of the segments are padded such that each of the segments begins on a byte boundary,
      the segments include a given segment, and
      generating the coded slice NAL unit comprises performing a padding operation that appends bits to the given segment if a next treeblock is inside the slice and is associated with a different picture partition than the given segment.

2. The method of claim 1, wherein generating the coded slice NAL unit comprises generating a slice header that indicates entry points for one or more of the segments.

3. The method of claim 2, wherein the entry points for the segments indicate byte offsets of the segments.

4. The method of claim 1, wherein the picture partitions are tiles or wavefront parallel processing (WPP) waves.

5. The method of claim 1, further comprising generating a parameter set associated with the picture, the parameter set including a flag that has a first value, the first value indicating that the one or more of the segments are padded such that each of the segments begins at a byte boundary, and
   wherein when the flag has a second value, the segments may or may not begin at byte boundaries.

6. The method of claim 1,
   wherein the picture partitions are tiles; and
   wherein generating the coded slice NAL unit comprises performing a padding operation that ensures that the segments begin at byte boundaries only after determining that the tiles are independent of one another.

7. A method of decoding video data, the method comprising:
   storing a coded slice network abstraction layer (NAL) unit that includes encoded representations of treeblocks associated with a slice of a picture, the picture partitioned into a plurality of picture partitions, the encoded representations of the treeblocks grouped into segments associated with different ones of the picture partitions, wherein:
      one or more of the segments are padded such that each of the segments begins at a byte boundary,
      the segments include a given segment, and
      the coded slice NAL unit includes bits appended to the given segment if a next treeblock is inside the slice and is associated with a different picture partition than the given segment; and
   decoding the encoded representations of the treeblocks.

8. The method of claim 7, wherein the coded slice NAL unit comprises a slice header that indicates entry points for one or more of the segments.

9. The method of claim 8, wherein the entry points for the segments indicate byte offsets of the segments.

10. The method of claim 7, wherein the picture partitions are tiles or wavefront parallel processing (WPP) waves.

11. The method of claim 7, further comprising storing a parameter set associated with the picture, the parameter set including a flag that has a first value, the first value indicating that the one or more of the segments are padded such that each of the segments begin at a byte boundary, and
    wherein when the flag has a second value, the segments may or may not begin at byte boundaries.

12. The method of claim 7,
    wherein the picture partitions are tiles; and
    wherein one or more of the segments are padded such that the segments begin at byte boundaries when the tiles are independent of one another.

13. The method of claim 7, wherein decoding the encoded representations of the treeblocks comprises decoding the encoded representations of the treeblocks in two or more of the segments in parallel.

14. A video encoding device that encodes video data, the video encoding device comprising:
    a data storage medium configured to store the video data; and
    one or more processors configured to:
       divide a picture of the video data into a plurality of picture partitions, the picture having a plurality of treeblocks, the picture partitions associated with non-overlapping subsets of the treeblocks of the picture; and
       generate a coded slice network abstraction layer (NAL) unit that includes encoded representations of the treeblocks that are associated with a slice of the picture, the encoded representations of the treeblocks grouped within the coded slice NAL unit into segments associated with different ones of the picture partitions, wherein:
          one or more of the segments are padded such that each of the segments begins on a byte boundary,
          the segments include a given segment, and
          the one or more processors are configured to perform a padding operation that appends bits to the given segment if a next treeblock is inside the slice and is associated with a different picture partition than the given segment.

15. The video encoding device of claim 14, wherein the one or more processors are configured to generate the coded slice NAL unit such that the coded slice NAL unit includes a slice header that indicates entry points for one or more of the segments.

16. The video encoding device of claim 15, wherein the entry points for the segments indicate byte offsets of the segments.

17. The video encoding device of claim 14, wherein the picture partitions are tiles or wavefront parallel processing (WPP) waves.

18. The video encoding device of claim 14, wherein the one or more processors are configured to generate a parameter set associated with the picture, the parameter set including a flag that has a first value, the first value indicating that the one or more of the segments are padded such that each of the segments begins at a byte boundary, and
wherein when the flag has a second value, the segments may or may not begin at byte boundaries.

19. The video encoding device of claim 14,
wherein the picture partitions are tiles; and
wherein one or more processors are configured to perform a padding operation that ensures that the segments begin at byte boundaries only after determining that the tiles are independent of one another.

20. The video encoding device of claim 14, wherein the video encoding device is a mobile computing device.

21. A video decoding device that decodes video data, the video decoding device comprising:
a memory that stores a coded slice network abstraction layer (NAL) unit that includes encoded representations of treeblocks associated with a slice of a picture, the picture divided into a plurality of picture partitions, the encoded representations of the treeblocks grouped into segments associated with different ones of the picture partitions, wherein:
one or more of the segments are padded such that each of the segments begins at a byte boundary,
the segments include a given segment, and
the coded slice NAL unit includes bits appended to the given segment if a next treeblock is inside the slice and is associated with a different picture partition than the given segment; and
one or more processors that are configured to decode the encoded representations of the treeblocks.

22. The video decoding device of claim 21, wherein the coded slice NAL unit comprises a slice header that indicates entry points for one or more of the segments.

23. The video decoding device of claim 22, wherein the entry points for the segments indicate byte offsets of the segments.

24. The video decoding device of claim 21, wherein the picture partitions are tiles or wavefront parallel processing (WPP) waves.

25. The video decoding device of claim 21, wherein the memory stores a parameter set associated with the picture, the parameter set including a flag that has a first value, the first value indicating that the one or more of the segments are padded such that each of the segments begins at a byte boundary, and
wherein when the flag has a second value, the segments may or may not begin at byte boundaries.

26. The video decoding device of claim 21, wherein the video decoding device is a mobile computing device.

27. The video decoding device of claim 21, wherein the one or more processors are configured to decode the encoded representations of the treeblocks in two or more of the segments in parallel.

28. A non-transitory computer-readable storage medium that stores instructions that, when executed by one or more processors, configure a video encoding device to:
divide a picture into a plurality of picture partitions, the picture having a plurality of treeblocks, the picture partitions associated with non-overlapping subsets of the treeblocks of the picture; and
generate a coded slice network abstraction layer (NAL) unit that includes encoded representations of the treeblocks that are associated with a slice of the picture, the encoded representations of the treeblocks grouped within the coded slice NAL unit into segments associated with different ones of the picture partitions, wherein:
one or more of the segments are padded such that each of the segments begins on a byte boundary,
the segments include a given segment, and
the one or more processors are configured to perform a padding operation that appends bits to the given segment if a next treeblock is inside the slice and is associated with a different picture partition than the given segment.

29. A non-transitory computer-readable storage medium that stores instructions that, when executed by one or more processors, configure a video decoding device to:
store a coded slice network abstraction layer (NAL) unit that includes encoded representations of treeblocks associated with a slice of a picture, the picture divided into a plurality of picture partitions, the encoded representations of the treeblocks grouped into segments associated with different ones of the picture partitions, wherein:
one or more of the segments are padded such that each of the segments begins at a byte boundary,
the segments include a given segment, and
the coded slice NAL unit includes bits appended to the given segment if a next treeblock is inside the slice and is associated with a different picture partition than the given segment; and
decode the encoded representations of the treeblocks.

30. A video encoding device that encodes video data, the video encoding device comprising:
means for dividing a picture into a plurality of picture partitions, the picture having a plurality of treeblocks, the picture partitions associated with non-overlapping subsets of the treeblocks of the picture; and
means for generating a coded slice network abstraction layer (NAL) unit that includes encoded representations of the treeblocks that are associated with a slice of the picture, the encoded representations of the treeblocks grouped within the coded slice NAL unit into segments associated with different ones of the picture partitions, wherein:
one or more of the segments are padded such that each of the segments begins on a byte boundary,
the segments include a given segment, and
generating the coded slice NAL unit comprises performing a padding operation that appends bits to the given segment if a next treeblock is inside the slice and is associated with a different picture partition than the given segment.

31. A video decoding device that decodes video data, the video decoding device comprising:
- means for storing a coded slice network abstraction layer (NAL) unit that includes encoded representations of treeblocks associated with a slice of a picture, the picture divided into a plurality of picture partitions, the encoded representations of the treeblocks grouped into segments associated with different ones of the picture partitions, wherein:
  - one or more of the segments are padded such that each of the segments begins at a byte boundary,
  - the segments include a given segment, and
  - the coded slice NAL unit includes bits appended to the given segment if a next treeblock is inside the slice and is associated with a different picture partition than the given segment; and
- means for decoding the encoded representations of the treeblocks.

\* \* \* \* \*